(12) United States Patent
Li et al.

(10) Patent No.: US 11,252,961 B2
(45) Date of Patent: Feb. 22, 2022

(54) USE OF QUERCETIN IN PLANT AGING PROMOTER

(71) Applicant: TOBACCO RESEARCH INSTITUTE OF CHINESE ACADEMY OF AGRICULTURAL SCIENCES, Qingdao (CN)

(72) Inventors: Wei Li, Qingdao (CN); Yongfeng Guo, Qingdao (CN); Zenglin Zhang, Qingdao (CN); Zhenbiao Zhang, Qingdao (CN); Lichao Wen, Qingdao (CN); Xiaoming Gao, Qingdao (CN)

(73) Assignee: TOBACCO RESEARCH INSTITUTE OF CHINESE ACADEMY OF AGRICULTURAL SCIENCES, Qingdao (CN)

( * ) Notice: Subject to any disclaimer, the term of this patent is extended or adjusted under 35 U.S.C. 154(b) by 0 days.

(21) Appl. No.: 17/332,954

(22) Filed: May 27, 2021

(65) Prior Publication Data

US 2021/0321612 A1 Oct. 21, 2021

Related U.S. Application Data

(63) Continuation of application No. PCT/CN2020/113716, filed on Sep. 7, 2020.

(30) Foreign Application Priority Data

Sep. 11, 2019 (CN) .......................... 201910858516.2

(51) Int. Cl.
*A01N 43/16* (2006.01)
*A01N 43/84* (2006.01)

(52) U.S. Cl.
CPC ............. *A01N 43/16* (2013.01); *A01N 43/84* (2013.01)

(58) Field of Classification Search
CPC .................................. A01N 43/16; A01N 43/84
See application file for complete search history.

(56) References Cited

FOREIGN PATENT DOCUMENTS

| CN | 104798812 A | | 7/2015 |
|---|---|---|---|
| CN | 106234415 A | | 12/2016 |
| CN | 106614586 A | * | 5/2017 |
| CN | 106614586 A | | 5/2017 |
| CN | 109182347 A | | 1/2019 |
| CN | 110476983 A | | 11/2019 |
| JP | 51018668 A | * | 2/1976 |
| WO | WO2007039059 A1 | | 4/2007 |

OTHER PUBLICATIONS

Karanov, E.,1972. Effect of some indole and phenolic compounds on the ageing of detached leaves. In: Hormonal Regulation of Plant Growth and Development (Eds. H. Kaldewey, Y. Vardar), Verlag Chemie, Weinheim, 467-472. (Year: 1972).*
Search Report of the priority CN application.
International Search Report of PCT/CN2020/113716.
"Growth Inhibitory Mechanism of Quercetin on the Anabena flosaquae", Advances in Environmental Protection, 2018, 8(3), 238-248.
"Effect of Ethephon on Senescence Related Physiological Indexes of Leaf Discs", Journal of Guizhou University( Natural Sciences), vol. 34, No. 4, Aug. 2017.
"Field Control Effects of Flavonoids for Tobacco Bacterial Wilt", Plant Doctor, vol. 32, No. 1, Feb. 2019.
"Physiology Effects of Light Quality on Leaf Senescence in Flue-cured Tobacco Leaves", Southwest China Journal of Agricultural Sciences, vol. 29, No. 7, 2016.
"Effect of Quercetin and Epicatechin on the Transcript Expression", Global Journal of Biotechnology & Biochemistry 7 (1): 19-25, 2012.
Written Opinion of ISA for PCT/CN2020/113716.
NPL5: "Effects and Physiological Mechanism of Exogenous Quercetin on Fruit Senescence in Apples", by Long Wang, Agriculture, Chinese Selected Doctoral Dissertations and Master's These Full-Text Databases (Doctoral), No. 3, Sep. 15, 2003.
NPL7: "Effect of some indole and phenolic compounds on the aging of detached leaves", by E. N. Karanov, Hormonal Regulation in Plant Growth and Development, Proc. Adv. Study Inst. Izmir 1971, pp. 467-472, Published Dec. 31, 1973.

* cited by examiner

*Primary Examiner* — Mina Haghighatian
*Assistant Examiner* — Nathan W Schlientz
(74) *Attorney, Agent, or Firm* — J.C. Patents

(57) ABSTRACT

The present application provides an application of quercetin in a plant senescence accelerator, which belongs to the field of plant senescence accelerators and its application, and can prepare a plant senescence accelerator by using quercetin and apply the accelerator in practical production to accelerate the senescence process of plant particularly crop leaves. The quercetin plant senescence accelerator is prepared by mixing a quercetin mother solution with a 1/2 MS solution of 2-(N-morpholino)ethanesulfonic. In the present application, by adopting directly spraying method, the senescence process of plant leaves can be accelerated, and will not cause additional adverse reactions to plants.

8 Claims, 7 Drawing Sheets

USE OF QUERCETIN IN PLANT AGING PROMOTER

CROSS-REFERENCE TO RELATED APPLICATIONS

This application is a continuation application of international Application No. PCT/CN2020/113716, filed on Sep. 7, 2020, which claims the priority benefits of Chinese Patent Application No. 201910858516.2 filed on Sep. 11, 2019 and entitled "USE OF QUERCETIN IN PLANT SENESCENCE ACCELERATOR", the contents of the above identified applications are hereby incorporated by reference in their entirety.

TECHNICAL FIELD

The present application belongs to the field of plant senescence accelerators, and particularly relates to use of quercetin in a plant senescence accelerator.

BACKGROUND OF THE PRESENT INVENTION

Leaf senescence is a programmed cell death process which is accompanied by a series of physiological and biochemical changes, including reduction of photosynthesis, degradation of chlorophyll, degradation of biological macromolecules, nutrient remobilization and the like. Therefore, leaf senescence will affect crop growth, nutrient accumulation and yield formation. Planned control of senescence during agricultural production can improve crop growth and seed yield, and can also improve the agronomic trait and stress resistance to a certain extent.

SUMMARY OF THE PRESENT INVENTION

An objective of the present application is to provide use of quercetin in a plant senescence accelerator, wherein the accelerator has the effects of promoting the senescence of plant leaves.

One implementation of the present application provides use of quercetin in a plant senescence accelerator.

Optionally, the quercetin plant senescence accelerator comprises a quercetin mother solution, and the quercetin mother solution is prepared by dissolving quercetin in dimethyl sulfoxide.

Optionally, a concentration of quercetin in the quercetin mother solution is 8 to 12 mmol/L.

Optionally, the quercetin plant senescence accelerator is prepared by mixing the quercetin mother solution with a 1/2 MS solution of 2-(N-morpholino)ethanesulfonic acid.

Optionally, the concentration of the quercetin mother solution is 8-12 mmol/L, and the concentration of the 1/2 MS solution of 2-(N-morpholino)ethanesulfonic acid is 2.8-3 mmol/L.

Optionally, the method for preparing the quercetin plant senescence accelerator comprises the following steps:

preparing the quercetin mother solution: weighing quercetin compound powder, and dissolving in a solvent to obtain the quercetin mother solution;

preparing a 1/2 MS medium: weighing MS powder, dissolving in distilled water, and adjusting a pH of the solution to 5.8-6.0 to obtain the 1/2 MS medium;

preparing the 1/2 MS solution of 2-(N-morpholino)ethanesulfonic acid: weighing 2-(N-morpholino)ethanesulfonic acid, and adding to the 1/2 MS medium to obtain the 1/2 MS solution of 2-(N-morpholino)ethanesulfonic acid; and preparing the quercetin plant senescence accelerator: adding the quercetin mother solution to the 1/2 MS solution of 2-(N-morpholino)ethanesulfonic acid, and stirring uniformly to obtain the quercetin plant senescence accelerator.

Optionally, in the step of preparing the quercetin mother solution, the solvent is dimethyl sulfoxide.

Optionally, in the step of preparing the quercetin plant senescence accelerator, a volume ratio of the 1/2 MS solution of 2-(N-morpholino)ethanesulfonic acid to the quercetin mother solution is (500-10000):1.

Optionally, the quercetin plant senescence accelerator is applied onto leaves of a plant; the quercetin plant senescence accelerator is used on leaves of tobacco at an early mature stage or leaves of *Arabidopsis thaliana*.

Optionally, the method for applying the quercetin plant senescence accelerator is directly spraying the accelerator with a concentration of 0.5-20 μmol/L onto leaves of a plant.

Compared with the prior art, the present application has the following advantages and positive effects:

(1) At least one implementation of the present application provides the use of quercetin in a plant senescence accelerator, and the quercetin plant senescence accelerator finished product is prepared by mixing the quercetin mother solution with the 1/2 MS solution of 2-(N-morpholino)ethanesulfonic acid.

(2) The quercetin plant senescence accelerator involved in at least one implementation of the present application has the advantages of simple preparation process, easily available raw materials, large-scale synthesis, low cost and the like.

(3) The quercetin plant senescence accelerator involved in at least one implementation of the present application can accelerate the senescence process of leaves and will not cause additional adverse reactions to plants.

DETAILED DESCRIPTION OF THE PRESENT INVENTION

Figure 1A:
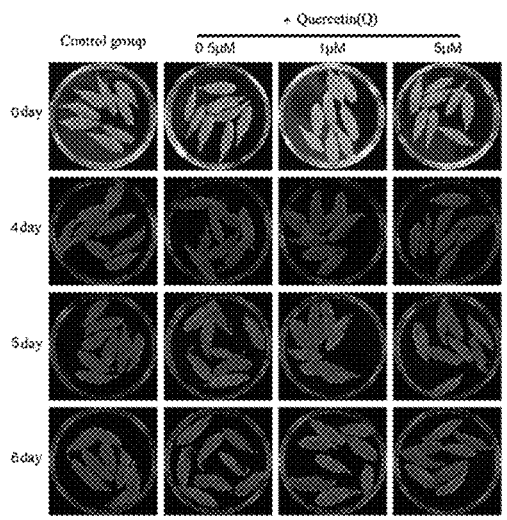
FIGS. 1A-1D are diagrams showing the phenotype of detached leaves of *Arabidopsis thaliana* under an accelerator treatment according to one embodiment of the present application.
Figure 1B:
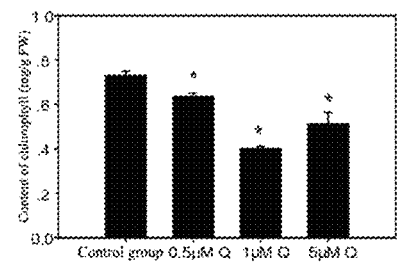
Figure 1C:
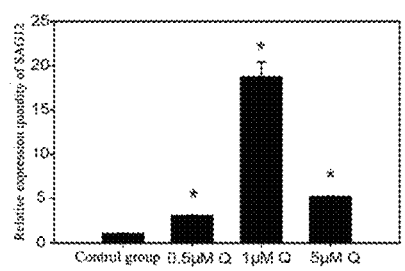
Figure 1D:
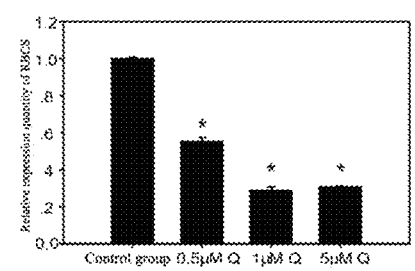

The technical solutions in the embodiments of the present application will be clearly and completely described below.

Apparently, the embodiments to be described are merely some but not all of the embodiments of the present application. All other embodiments obtained on the basis of the embodiments of the present application by a person of ordinary skill in the art without paying any creative effort shall fall into the protection scope of the present application.

It is to be noted that the term "mother solution" used in the embodiments refers to a solution with a higher concentration, and the solution needs to be diluted in subsequent use to serve as a working solution with a lower concentration.

The embodiments of the present application provide use of quercetin in a plant senescence accelerator (hereinafter referred to as an accelerator for short). The accelerator comprises a quercetin mother solution. Optionally, the quercetin mother solution is prepared by dissolving quercetin in dimethyl sulfoxide.

Optionally, the quercetin plant senescence accelerator is prepared by mixing the quercetin mother solution with a 1/2 CMS solution of 2-(N-morpholino)ethanesulfonic acid.

Optionally, a concentration of quercetin in the quercetin mother solution is 8-12 mmol/L, and a concentration of the 1/2 MS solution of 2-(N-morpholino)ethanesulfonic acid is 2.8-3 mmol/L.

The concentration of the quercetin mother solution may select 8, 9, 10, 11 or 12 mmol/L, and the concentration of the 1/2 MS solution of 2-(N-morpholino)ethanesulfonic acid may select 2.8, 2.9 or 3 mmol/L.

Optionally, the method for preparing the quercetin plant senescence accelerator comprises the following steps:

S1: Preparation of the quercetin mother solution: quercetin compound powder is weighed and dissolved in a solvent to obtain the quercetin mother solution; optionally, the concentration of quercetin in the mother solution is 8 to 12 mmol/L;

S2: Preparation of a 1/2 MS medium: MS powder is weighed and dissolved in distilled water, and a pH of the solution is adjusted to 5.8-6.0 to obtain the 1/2 MS medium;

The MS powder is MS (Murashige and Skoog) basic medium powder. The operation step of preparing the 1/2 MS medium belongs to the common knowledge in the art and will not be repeated here.

S3: Preparation of the 1/2 MS solution of 2-(N-morpholino)ethanesulfonic acid: 2-(N-morpholino)ethanesulfonic acid is weighed and added to the 1/2 MS medium to obtain the 1/2 MS solution of 2-(N-morpholino)ethanesulfonic acid; optionally, the concentration of 2-(N-morpholino)ethanesulfonic acid in the solution is 2.8-3 mmol/L.

In S3, the reason why the 1/2 MS solution is selected to dissolve 2-(N-morpholino)ethanesulfonic acid is that: this liquid medium can fully dissolve 2-(N-morpholino)ethanesulfonic acid, ensuring that a certain osmotic potential is formed on the surface of a plant and laying the foundation for quercetin to play its role; and, the liquid medium as a solvent can also provide a large number of nutrient elements, ensuring that the effect is achieved; it is more suitable for detached leaves.

S4: Preparation of the quercetin plant senescence accelerator: the quercetin mother solution is added to the 1/2 MS solution of 2-(N-morpholino)ethanesulfonic acid and stirred uniformly to obtain the quercetin plant senescence accelerator.

Optionally, in S1, the solvent is dimethyl sulfoxide. In the embodiments, the reason why dimethyl sulfoxide is selected as a solvent is that dimethyl sulfoxide has good solubility for quercetin and can promote better dissolution of quercetin so that quercetin plays a corresponding role.

Optionally, in S4, the volume ratio of the 1/2 MS solution of 2-(N-morpholino)ethanesulfonic acid to the quercetin mother solution is (500-10000):1. In practical applications, it is also possible to mix other liquid (e.g., water) with the quercetin mother solution to obtain the accelerator. For example, the accelerator is prepared from water and the quercetin mother solution at a volume ratio of (500-10000):1.

Optionally, the quercetin plant senescence accelerator is applied onto leaves of a plant, and the quercetin plant senescence accelerator is used on leaves of tobacco in an early mature stage or leaves of *Arabidopsis thaliana*.

The leaves of tobacco at the early mature stage mainly refer to leaves of tobacco after topping; the accelerator may be sprayed before leaves are immature; immature leaves are green leaves or leaves that are not mature completely.

Optionally, the method for applying the quercetin plant senescence accelerator directly spraying the accelerator having a concentration of 0.5 to 10 μmol/L onto leaves of the plant. In the embodiments, the quercetin plant senescence accelerator having a concentration of 0.5, 1, 5, 10, 15 or 20 μmol/L may be used as a working solution. It is to be noted that, during spraying on living, the problems such as fast volatilization speed of the liquid and limited absorption degree of attached leaves need to be taken into consideration, which can easily lead to the indistinctive effect of accelerating senescence due to too low concentration. Therefore, during actual practices on attached leaves, based on the highest concentration limit, those skilled can properly adjust the concentration according to actual conditions; the concentration may be adjusted to 20 μmol/L or slightly higher. The frequency of use may be 2 to 5 times per week according to actual conditions.

To describe the use of quercetin in a plant senescence accelerator provided in the embodiments of the present application more clearly, the following description will be given by specific embodiments.

Embodiment 1

A quercetin plant senescence accelerator comprised: a quercetin mother solution in which a concentration of quercetin was 10 mmol/L, and a 1/2 MS solution of 2-(N-morpholino)ethanesulfonic acid in which a concentration of 2-(N-morpholino)ethanesulfonic acid was 2.8 mmol/L, wherein the 1/2 MS solution of 2-(N-morpholino)ethanesulfonic acid was a solution prepared by dissolving 2-(N-morpholino)ethanesulfonic acid in a 1/2 MS medium.

The specific method for preparing the accelerator comprised the following steps:

S1. Preparation of the quercetin mother solution: quercetin powder was weighed and dissolved in a solvent dimethyl sulfoxide to obtain the quercetin mother solution having a concentration of 10 mmol/L for further use;

S2: Preparation of the 1/2 MS medium: MS powder was weighed and dissolved in distilled water, and a pH of the solution was adjusted to 6.0 to obtain the 1/2 MS medium;

S3: Preparation of the 1/2 MS solution of 2-(N-morpholino)ethanesulfonic acid: 2-(N-morpholino)ethanesulfonic acid was weighed and added to the 1/2 MS medium to obtain the 1/2 MS solution of 2-(N-morpholino)ethanesulfonic acid having a concentration of 2.8 mmol/L;

S4: Preparation of the quercetin plant senescence accelerator: the quercetin mother solution was added to the 1/2 MS solution of 2-(N-morpholino)ethanesulfonic acid and stirred uniformly to obtain the quercetin plant senescence accelerator finished product, wherein a concentration of the quercetin plant senescence accelerator finished product could be 0.5, 1, 5, 10 and 20 µmol/L by adjusting the volume ratio of the two solutions.

Embodiment 2

A quercetin plant senescence accelerator comprised: a quercetin mother solution in which a concentration of quercetin was 8 mmol/L, and a 1/2 MS solution of 2-(N-morpholino)ethanesulfonic acid in which a concentration of 2-(N-morpholino)ethanesulfonic acid was 3 mmol/L, wherein the 1/2 MS solution of 2-(N-morpholino)ethanesulfonic acid was a solution prepared by dissolving 2-(N-morpholino)ethanesulfonic acid in a 1/2 MS medium.

The specific method for preparing the accelerator comprised the following steps:

S1. Preparation of the quercetin mother solution: quercetin powder was weighed and dissolved in a solvent dimethyl sulfoxide to obtain the quercetin mother solution having a concentration of 8 mmol/L for further use;

S2: Preparation of the 1/2 MS medium: MS powder was weighed and dissolved in distilled water, and a pH of the solution was adjusted to 5.8 to obtain the 1/2 MS medium;

S3: Preparation of the 1/2 MS solution of 2-(N-morpholino)ethanesulfonic acid: 2-(N-morpholino)ethanesulfonic acid was weighed and added to the 1/2 MS medium to obtain the 1/2 MS solution of 2-(N-morpholino)ethanesulfonic acid having a concentration of 3 mmol/L;

S4: Preparation of the quercetin plant senescence accelerator: the quercetin mother solution was added to the 1/2 MS solution of 2-(N-morpholino)ethanesulfonic acid and stirred uniformly to obtain the quercetin plant senescence accelerator finished to product, wherein a concentration of the quercetin plant senescence accelerator finished product could be 0.5, 1, 5, 10 and 20 µmol/L by adjusting the volume ratio of the two solutions.

Embodiment 3

A quercetin plant senescence accelerator comprised: a quercetin mother solution in which a concentration of quercetin was 12 mmol/L, and a 1/2 MS solution of 2-(N-morpholino)ethanesulfonic acid in which a concentration of 2-(N-morpholino)ethanesulfonic acid was 2.9 mmol/L, wherein the 1/2 MS solution of 2-(N-morpholino)ethanesulfonic acid was a solution prepared by dissolving 2-(N-morpholino)ethanesulfonic acid in a 1/2 MS medium.

The specific method for preparing the accelerator comprised the following steps:

S1. Preparation of the quercetin mother solution: quercetin powder was weighed and dissolved in a solvent dimethyl sulfoxide to obtain the quercetin mother solution having a concentration of 12 mmol/L for further use;

S2: Preparation of the 1/2 MS medium: MS powder was weighed and dissolved in distilled water, and the pH of the solution was adjusted to 6.0 to obtain the 1/2 MS medium;

S3: Preparation of the 1/2 MS solution of 2-(N-morpholino)ethanesulfonic acid: 2-(N-morpholino)ethanesulfonic acid was weighed and added to the 1/2 MS medium to obtain the 1/2 MS solution of 2-(N-morpholino)ethanesulfonic acid having a concentration of 2.9 mmol/L;

S4: Preparation of the quercetin plant senescence accelerator: the quercetin mother solution was added to the 1/2 MS solution of 2-(N-morpholino)ethanesulfonic acid and stirred uniformly to obtain the quercetin plant senescence accelerator finished product, wherein a concentration of the quercetin plant senescence accelerator finished product could be 0.5, 1, 5, 10 and 20 µmol/L by adjusting the volume ratio of the two solutions.

Experimental Test 1: Effects of the Quercetin Plant Senescence Accelerator on Detached Leaves of *Arabidopsis thaliana*

Detached leaves of the model organism *Arabidopsis thaliana* were treated by the quercetin plant senescence accelerator finished products prepared by the preparation method provided in one of Embodiments 1-3 of the present application, and the accelerating effect of the accelerator on the senescence of plant leaves was observed. The specific results were shown in FIGS. 1A-1D, and the experimental groups and their results were described below.

Experimental group: detached leaves of *Arabidopsis thaliana* were sprayed with the quercetin plant senescence accelerators having concentrations of 0.5 µmol/L, 1.0 µmol/L and 5 µmol/L in Embodiment 1, respectively. Control group: detached leaves of *Arabidopsis thaliana* were sprayed with the 1/2 MS solution of 2-(N-morpholino) ethanesulfonic acid in which the concentration of 2-(N-morpholino)ethanesulfonic acid was 2.8 mmol/L. Phenotypic symptoms of leaf senescence were observed on the 6th day after treatment, and a content of chlorophyll and the expression of the senescence-related marker gene in the leaves of *Arabidopsis thaliana* in the experimental group and the control group were analyzed.

The results indicated that: compared to the control group, the degree of senescence of the detached leaves in the experimental group was accelerated, and the senescence was most obvious when the detached leaves were treated at the concentration of 10 µmol/L, as shown in FIG. 1A. Meanwhile, from the analysis on the content of chlorophyll (the results were shown in FIG. 1B) and the expression of the senescence-related marker gene (the results were shown in FIGS. 1C-1D), the content of chlorophyll in the leaves treated at the concentration of 1.0 µmol/L was the lowest and the expression of the senescence-related marker gene was the highest, followed by other concentration groups; and, the senescence accelerating effect of the control group was the worst. These results indicated that the quercetin plant senescence accelerator could accelerate the senescence of leaves of *Arabidopsis thaliana*, and participate in the regulation of leaf senescence process.

Experimental Test 2: Effects of the Quercetin Plant Senescence Accelerator on Detached Leaves of *Nicotiana benthamiana*

Detached leaves of *Nicotiana benthamiana* were treated by the quercetin plant senescence accelerator finished products prepared by the preparation method provided in one of Embodiments 1-3 of the present application, and the accelerating effect of the accelerator on the senescence of plant leaves was observed. The specific results were shown in FIGS. 2A and 2B, and the experimental groups and their results were described below.

Experimental group: detached tobacco leaves were sprayed with the quercetin plant senescence accelerator having a concentration of 1.0 µmol/L in Embodiment 1. Control group: detached tobacco leaves were sprayed with the 1/2 MS solution of 2-(N-morpholino)ethanesulfonic acid in which the concentration of 2-(N-morpholino)ethanesulfonic acid was 2.8 mmol/L. Phenotypic symptoms of leaf senescence were observed on the 10th day after treatment, and a content of chlorophyll in the tobacco leaves was analyzed.

Figure 2A:
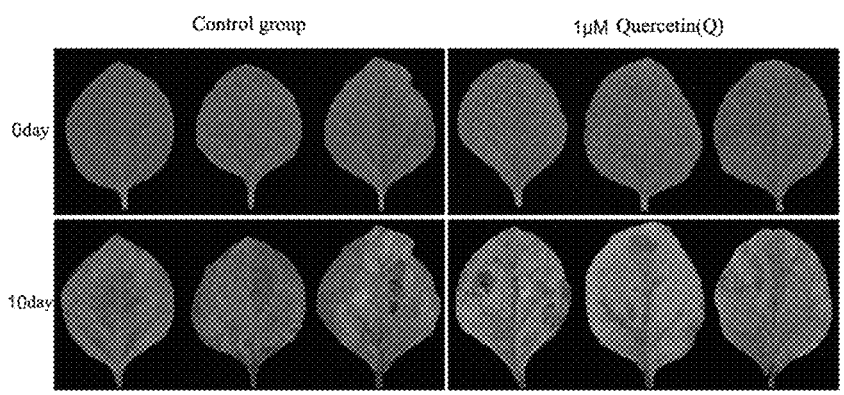
FIGS. 2A and 2B are diagrams showing the phenotype of detached leaves of *Nicotiana benthamiana* under an accelerator treatment according to one embodiment of the present application.
Figure 2B:
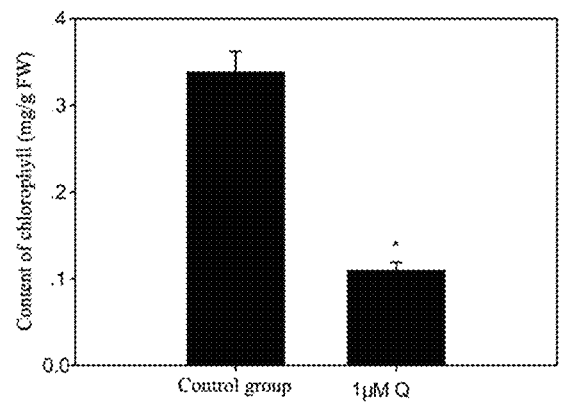

The results indicated that: from the analysis on phenotypic results, as shown in FIG. 2A, compared to the control group, the leaf senescence process could be accelerated by treating detached tobacco leaves using the quercetin plant senescence accelerator with a concentrations of 1.0 µmol/L; and, from the analysis on the results of the content of chlorophyll, as shown in FIG. 2B, compared to the control group, the content of chlorophyll in tobacco leaves could be significantly reduced when treated with the quercetin senescence accelerator. These results indicated that the quercetin plant senescence accelerator could accelerate the senescence of tobacco leaves.

Experimental Test 3: Effects of Spraying the Quercetin Plant Senescence Accelerator onto Living Plants of *Arabidopsis thaliana*

Living plants of *Arabidopsis thaliana* were sprayed with the quercetin plant senescence accelerator finished products prepared by the preparation method provided in one of Embodiments 1-3 of the present application, and the accelerating effect of the accelerator on the senescence of plant leaves was observed. The specific results were shown in FIGS. 3A-3C, and the experimental groups and their results were described below.

Experimental group: living plants of *Arabidopsis thaliana* were sprayed with the quercetin plant senescence accelerators with concentrations of 10 µmol/L and 20 µmol/L in Embodiment 2, respectively. Control group: living plants *Arabidopsis thaliana* were sprayed with the 1/2 MS solution of 2-(N-morpholino)ethanesulfonic acid in which the concentration of 2-(N-morpholino)ethanesulfonic acid was 3 mmol/L.

Figure 3A:
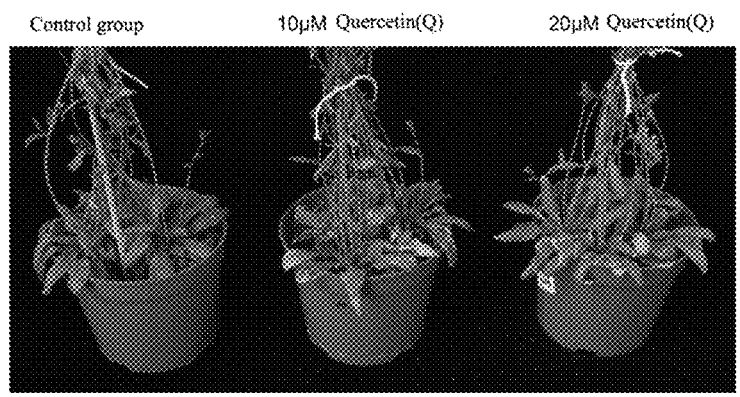
FIGS. 3A-3C are diagrams showing the phenotype of attached leaves of *Arabidopsis thaliana* under an accelerator treatment according to one embodiment of the present application.
Figure 3B:
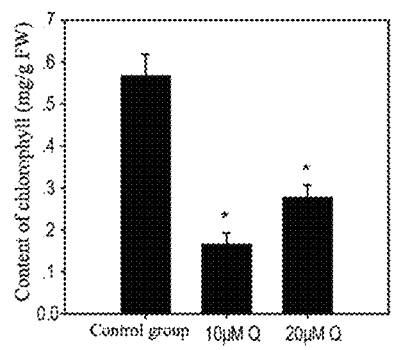
Figure 3C:
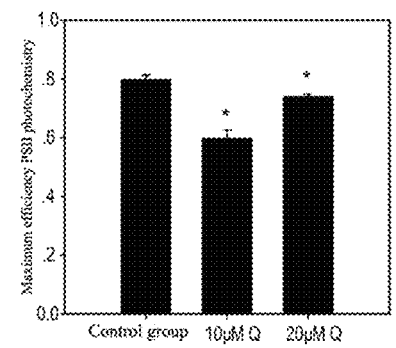

The results indicated that: compared to the control group, the senescence process of the *Arabidopsis thaliana* plants treated for 15 days with 10 µmol/L of the quercetin plant senescence accelerator and 20 µmol/L of the quercetin plant senescence accelerator was accelerated, as shown in FIG. 3A. From the analysis on the results of content of chlorophyll, as shown in FIG. 3B, a content of chlorophyll in leaves could be significantly reduced by exogenously spraying quercetin onto the attached leaves of *Arabidopsis thaliana*, and the maximum efficiency of PSII photochemistry in the experimental group was lower than that in the control group (FIG. 3C). In conclusion, it indicated that the quercetin plant senescence accelerator really had an obvious effect of accelerating the senescence of attached leaves of plant.

However, due to different adsorption degree of leaves or the like caused by the spraying mode, the concentration used could be increased properly. Therefore, different application concentrations of the plant senescence accelerator of the present application due to various factors in practical production should fall into the protection scope of the present application.

Experimental Test 4: Effects of Spraying the Quercetin Plant Senescence Accelerator onto Attached Leaves of *Nicotiana benthamiana*

Living plants of *Nicotiana benthamiana* were sprayed with the quercetin plant senescence accelerator finished product in Embodiment 3, and the accelerating effect of the accelerator on the senescence of plant leaves was observed. The specific results were shown in FIGS. 4A-4C, and the experimental groups and their results were described below.

Experimental group: living plants of *Nicotiana benthamiana* were sprayed with the quercetin plant senescence accelerators having concentrations of 1 µmol/L, 10 µmol/L and 20 µmol/L, respectively. Control group: living plants of *Nicotiana benthamiana* were sprayed with the 1/2 MS solution of 2-(N-morpholino)ethanesulfonic acid in which the concentration of 2-(N-morpholino)ethanesulfonic acid was 2.9 mmol/L.

Figure 4A:
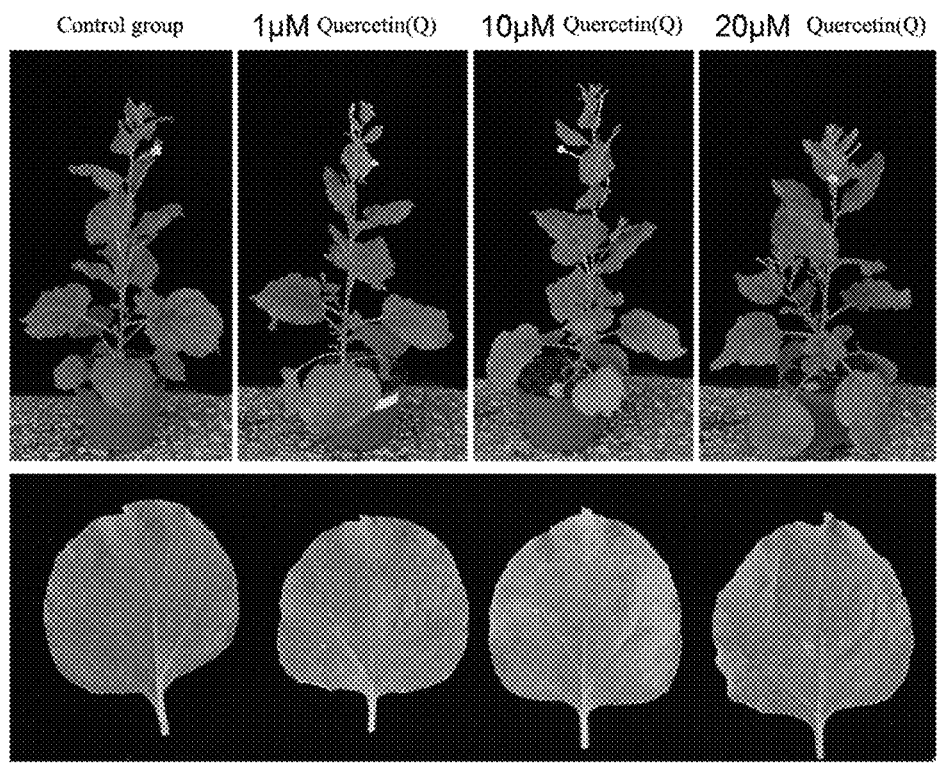
FIGS. 4A-4C are diagrams showing the phenotype of attached leaves of *Nicotiana benthamiana* under an accelerator treatment according to one embodiment of the present application.
Figure 4B:
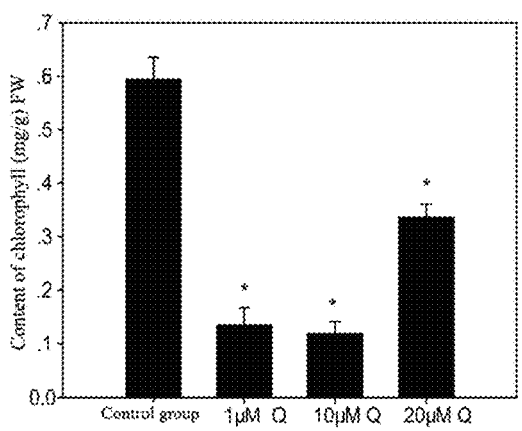
Figure 4C:
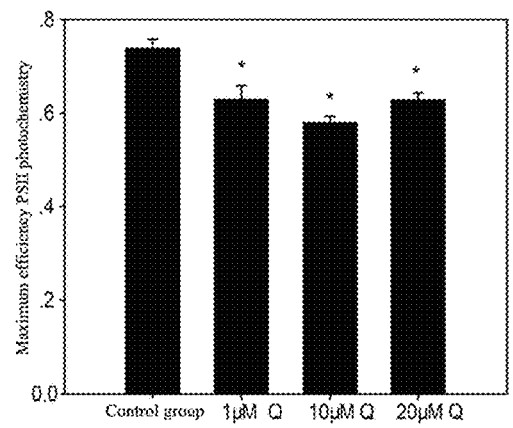

By analyzing the results, the results of the spray experimental groups indicated that: compared to the control group, the senescence process of tobacco treated for 21 days with 1 µmol/L of the quercetin plant senescence accelerator, 10 µmol/L of the quercetin plant senescence accelerator and 20 µmol/L of the quercetin plant senescence accelerator was accelerated (FIG. 4A). From the analysis on the results of content of chlorophyll, as shown in FIG. 4B, the content of chlorophyll in leaves could be significantly reduced by exogenously spraying quercetin onto the attached leaves of *Nicotiana benthamiana*, and the maximum efficiency of PSII photochemistry in the experimental group was lower than that in the control group (FIG. 4C). In conclusion, it indicated that the quercetin plant senescence accelerator really had an obvious effect of accelerating the senescence of attached leaves of plant.

Experimental Test 5: Effects of Spraying the Quercetin Plant Senescence Accelerator onto Common Tobacco in Fields It could be found from the experimental test 4 that 10 µmol/L was the optimal concentration of the quercetin plant senescence accelerator to accelerate mature and yellowing of tobacco leaves. Further, Honghuadajinyuan tobacco was sprayed with the quercetin plant senescence accelerator finished product, and the accelerating effect of the accelerator on the senescence of plant leaves was observed. The specific results were shown in FIGS. 5A-5D, and the experimental groups and their results were described below.

The quercetin plant senescence accelerator having a concentration of 0 (the control group) and the quercetin plant senescence accelerator having a concentration of 10 µmol/L were sprayed onto living plants of common tobacco.

Figure 5A:
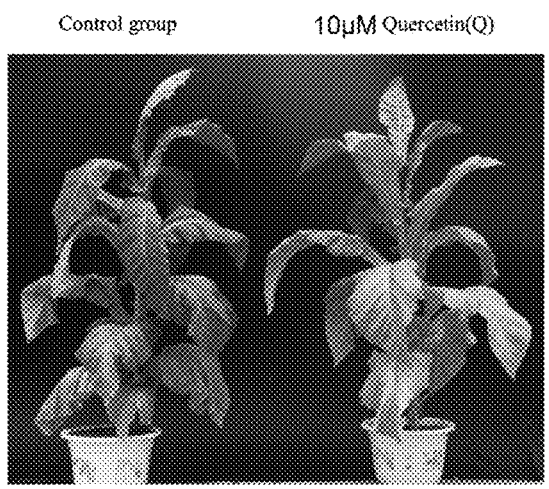
FIGS. 5A-5D are diagrams showing the phenotype of tobacco in field under an accelerator treatment according to one embodiment of the present application.
Figure 5B:
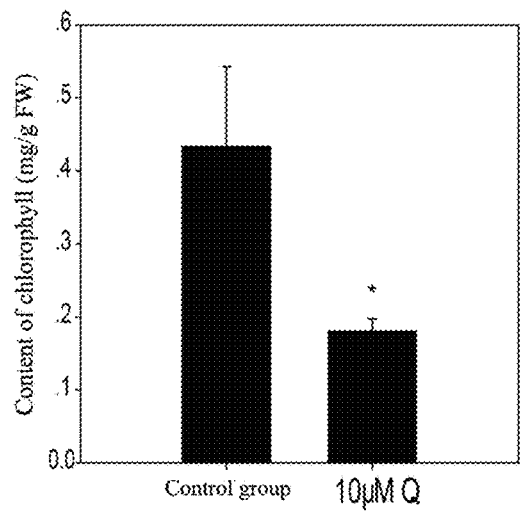
Figure 5C:
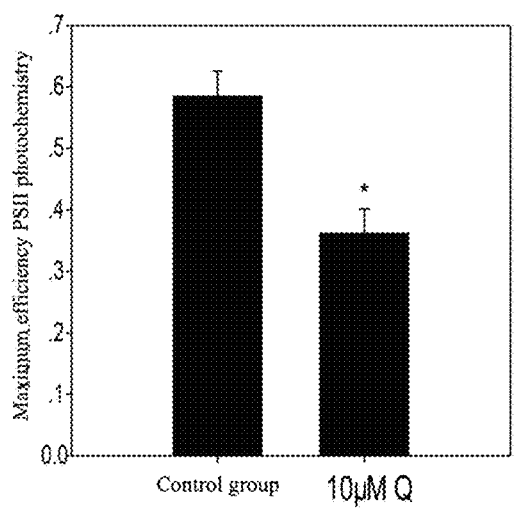
Figure 5D:
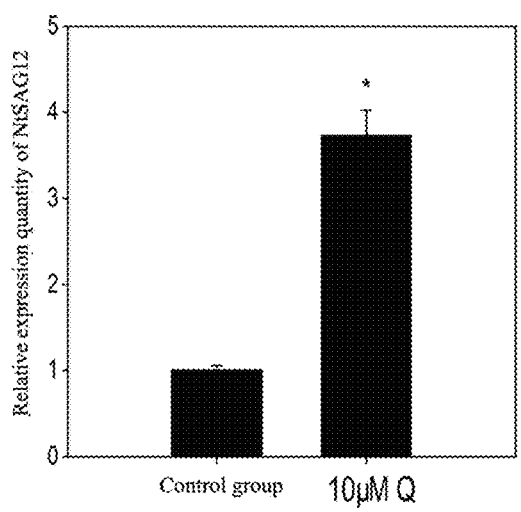

By analyzing the results, the results of the spray experimental groups indicated that: compared to the control group, the senescence process of tobacco treated for 15 days with 10 µmol/L of the quercetin plant senescence accelerator was accelerated (FIG. 5A). From the analysis on the results of content of chlorophyll, as shown in FIG. 5B, the content of chlorophyll in leaves could be significantly reduced by exogenously spraying quercetin onto the attached leaves of tobacco, the maximum efficiency of PSII photochemistry in the experimental group was lower than that in the control group (FIG. 5C), and the expression of the senescence marker gene NtSAG12 after the treatment using the quercetin plant senescence accelerator was increased significantly (FIG. 5D). In conclusion, it indicated that the quercetin plant senescence accelerator really had an obvious effect of accelerating the senescence of attached leaves of plant.

Experimental Test 6: Experiment of Flavonol Synthase Gene fls1-3 Mutant in *Arabidopsis thaliana*

Figure 6A:
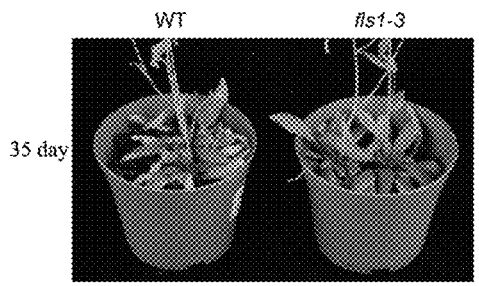
FIGS. 6A-6I are diagrams of delaying senescence by mutation of flavonol synthase gene FLS1 in *Arabidopsis thaliana*.
Figure 6B:
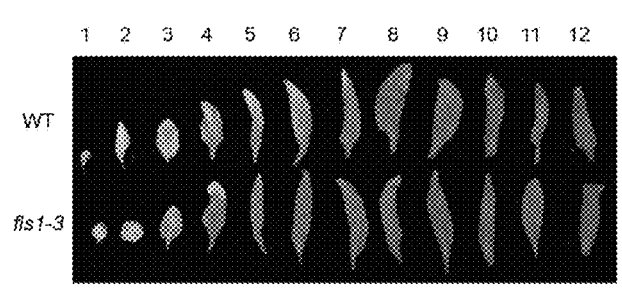
Figure 6C:
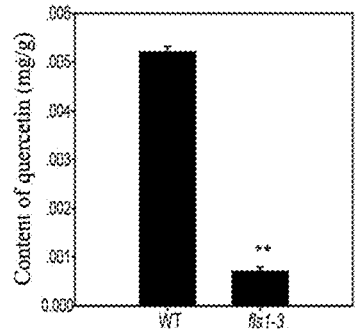
Figure 6D:
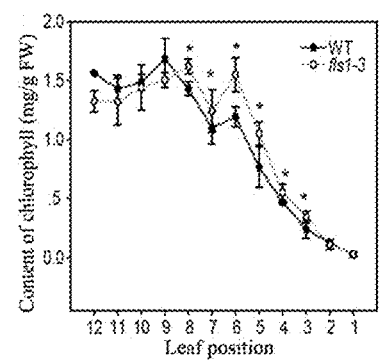
Figure 6E:
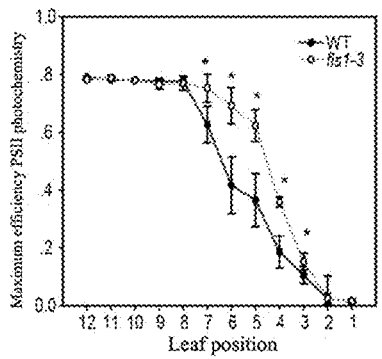
Figure 6F:
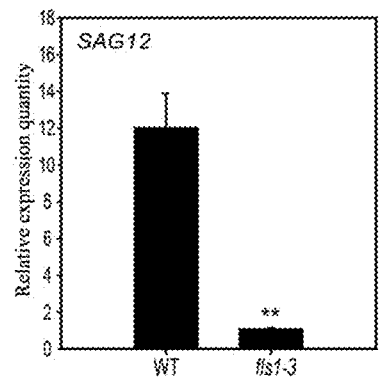
Figure 6G:
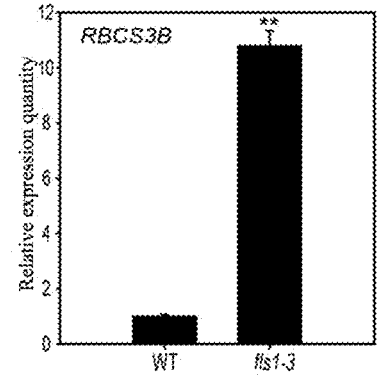
Figure 6H:
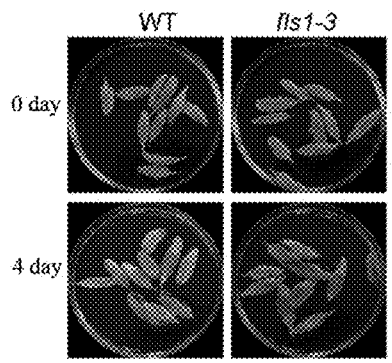
Figure 6I:
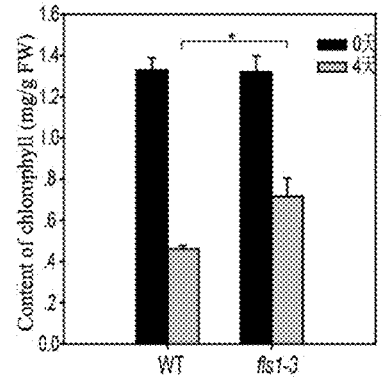

The *Arabidopsis thaliana* mutant fls1-3 was obtained by mutating the flavonol synthase gene FLS1 in *Arabidopsis thaliana*. The content of quercetin in this plant was significantly reduced, and had an obvious delayed senescence phenotype under the same conditions in comparison to the wide type (WT) in the control group, as shown in FIGS. 6A and 6B. Meanwhile, the content of quercetin in the fls1-3 mutant and the content of quercetin in the wide type were measured by high performance liquid chromatography-mass chromatography (HPLC-MS), respectively. The results indicated that the content of flavonol-quercetin in the fls1-3 mutant was obviously lower than that in the wide type, as shown in FIG. 6C. Further, the content of chlorophyll and the maximum efficiency PSII photochemistry (Fv/Fm) in the mutant rosette leaves (1 to 12 leaf positions, marked from down to up) were measured. The results indicated that, with the increase of the leaf position (from No. 1 to No. 12), the degree of senescence of leaves was decreased successively, and the content of chlorophyll and the Fv/Fm in both the fls1-3 mutant and the wide type were increased progressively; at the same leaf position, the content of chlorophyll and the Fv/Fm in the fls1-3 mutant plant were significantly higher than those in the wide type, as shown in FIGS. 6D-6E. Meanwhile, the senescence-related marker gene was analyzed by qRT-PCR, the results indicated that, compared to the wide type, the expression of the SAG12 gene that encodes cysteine proteases in the fls1-3 mutant was significantly down-regulated, and the expression of the photosynthesis-related gene RBCS3B in the fls1-3 mutant was significantly up-regulated, as shown in FIGS. 6F-6G. Furthermore, dark-induced senescence was also carried out on detached leaves; it was found that the senescence process of detached leaves of the fls1-3 mutant was obviously slower than that of the wide type in dark, and the content of chlorophyll in the fls1-3 mutant was significantly higher than that of the wide type, as shown in FIGS. 6H-6I.

Experimental Test 7: Experiment of the Overexpression of Flavonol Synthase Gene in *Arabidopsis thaliana*

Figure 7A:
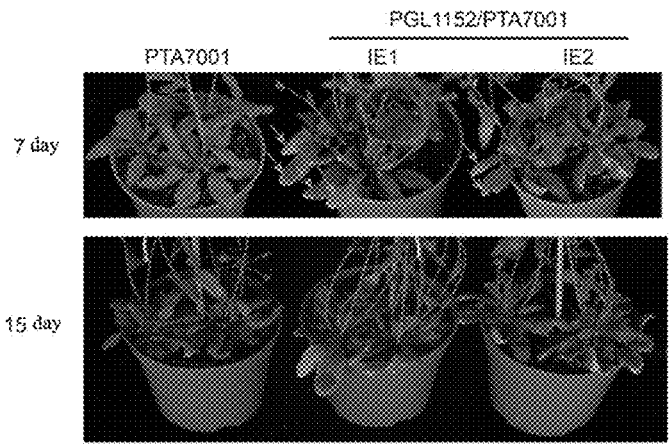
FIGS. 7A-7G are diagrams of promoting leaf senescence by overexpression of flavonol synthase gene FLS1 in *Arabidopsis thaliana*.
Figure 7B:
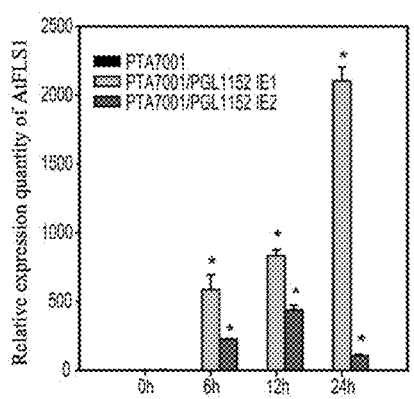
Figure 7C:
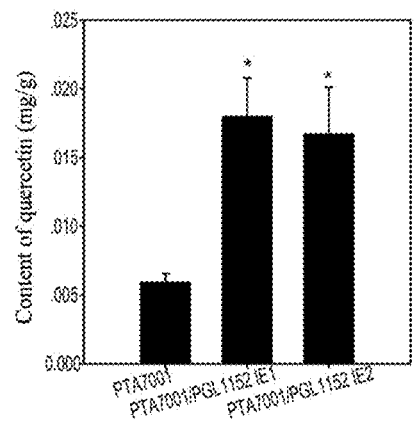
Figure 7D:
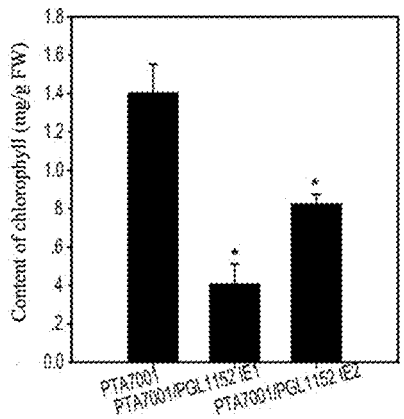
Figure 7E:
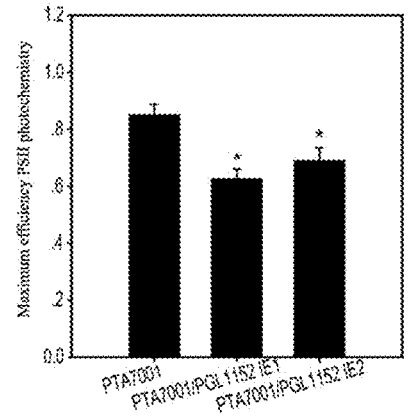
Figure 7F:
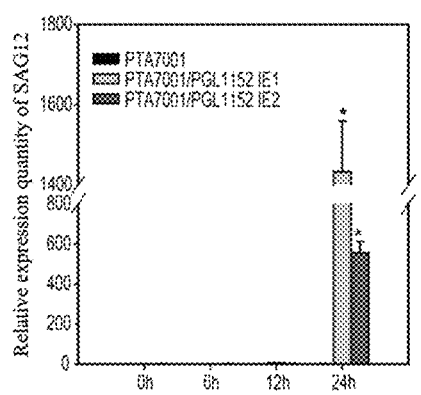
Figure 7G:
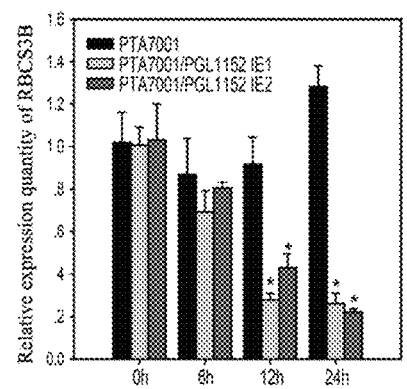

Flavonol synthase 1 AtFLS1, which controlled the synthesis of quercetin in *Arabidopsis thaliana*, was cloned into an induced overexpression vector. The correct constructs were transformed into *Agrobacterium* competent cells (GV3101), followed by transformation of *Arabidopsis thaliana* by *Agrobacterium*-mediatedfloral dip. Two independent transgene lines, i.e., IE1 and 1E2, were selected in the experimental group, and then grown under the same conditions together with the control line PTA7001. After 25 days of continuous illumination, the leaves of the plants were sprayed with 30 µM of dexamethasone (DEX), and were treated once every other day for 2 times. The phenotype was observed, and physiological and chemical measurement was performed. The results were shown in FIGS. 7A-7G. After the leaves were treated with DEX for 6 hours, the expression of the AtFLS1 gene was obviously up-regulated, and the content of the flavonol compound-quercetin was increased (FIGS. 7B-7C). After the treatment for 1 week, compared to the control PTA7001, the senescence process of the induced overexpression materials IE1 and 1E2 was significantly advanced, the leaf tips and leaf edges were yellowed, and the premature phenotype was more obvious at 2 weeks (FIG. 7A). Meanwhile, the senescence-related parameter results indicated that the content of chlorophyll and the maximum efficiency of PSII photochemistry (Fv/Fm) in the induced overexpression materials IE1 and 1E2 were obviously lower than those in the control (FIGS. 7D-7E), the expression of the senescence marker gene SAG12 was up-regulated by 600 to 1200 times after the treatment with DEX for 24 hours, and the expression of RBCS3B was obviously lower than that in the control PTA7001 (FIGS. 7F-7G).

The invention claimed is:

1. A method for accelerating senescence of tobacco or *Arabidopsis thaliana* with a quercetin plant senescence accelerator, comprising directly spraying the quercetin plant senescence accelerator with a quercetin concentration of 0.5-20 µmol/L onto leaves of tobacco at an early mature stage or leaves of *Arabidopsis thaliana*,
wherein the quercetin plant senescence accelerator comprises a quercetin mother solution and a 1/2 Murashige and Skoog (MS) solution of 2-(N-morpholino)ethanesulfonic acid.

2. The method according to claim 1, wherein the quercetin mother solution comprises quercetin dissolved in a solvent and a quercetin concentration of the quercetin mother solution is 8 to 12 mmol/L, and the 1/2 MS solution of 2-(N-morpholino)ethanesulfonic acid comprises MS and 2-(N-morpholino)ethanesulfonic acid dissolved in distilled water and a concentration of 2-(N-morpholino)ethanesulfonic acid in the 1/2 MS solution of 2-(N-morpholino)ethanesulfonic acid is 2.8-3 mmol/L.

3. The method according to claim 2, wherein the solvent is dimethyl sulfoxide.

4. The method according to claim 2, wherein a volume ratio of the 1/2 MS solution of 2-(N-morpholino)ethanesulfonic acid to the quercetin mother solution is (500-10000):1.

5. The method according to claim 1, wherein the quercetin plant senescence accelerator is prepared by the following steps:
preparing the quercetin mother solution: weighing quercetin compound powder, and dissolving in a solvent to obtain the quercetin mother solution;
preparing a 1/2 MS medium: weighing MS powder, dissolving in distilled water to obtain a solution, and adjusting a pH of the solution to 5.8 to 6.0 to obtain the 1/2 MS medium;
preparing the 1/2 MS solution of 2-(N-morpholino)ethanesulfonic acid: weighing 2-(N-morpholino)ethanesulfonic acid, and adding to the 1/2 MS medium to obtain the 1/2 MS solution of 2-(N-morpholino)ethanesulfonic acid; and
preparing the quercetin plant senescence accelerator: adding the quercetin mother solution to the 1/2 MS solution of 2-(N-morpholino)ethanesulfonic acid, and stirring uniformly to obtain the quercetin plant senescence accelerator.

6. The method according to claim 5, wherein in the step of preparing the quercetin mother solution, the solvent is dimethyl sulfoxide.

7. The method according to claim 5, wherein in the step of preparing the quercetin plant senescence accelerator, a volume ratio of the 1/2 MS solution of 2-(N-morpholino)ethanesulfonic acid to the quercetin mother solution is (500-10000):1.

8. The method according to claim 1, wherein the quercetin plant senescence accelerator is sprayed onto leaves of tobacco at an early mature stage or leaves of *Arabidopsis thaliana* 2 to 5 times per week.

* * * * *